Nov. 2, 1943.   H. J. SHAFER   2,333,205
PISTON VALVE
Original Filed Sept. 13, 1940   2 Sheets-Sheet 1
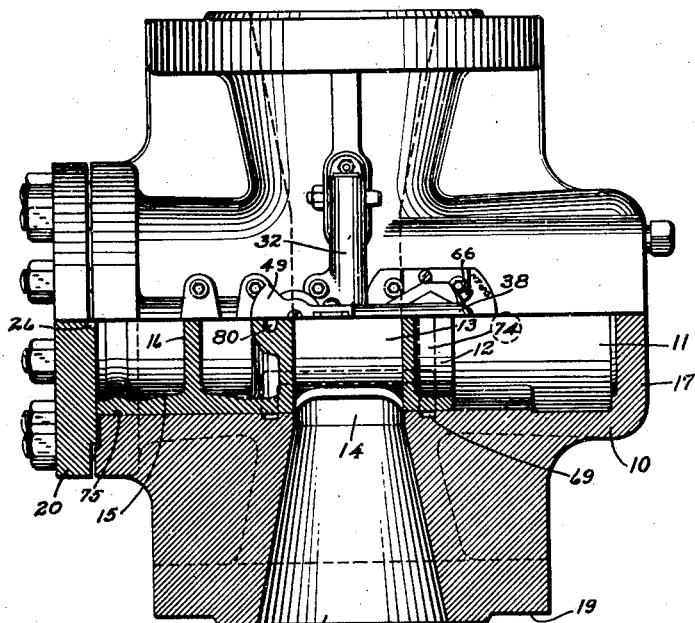
Fig. 1.
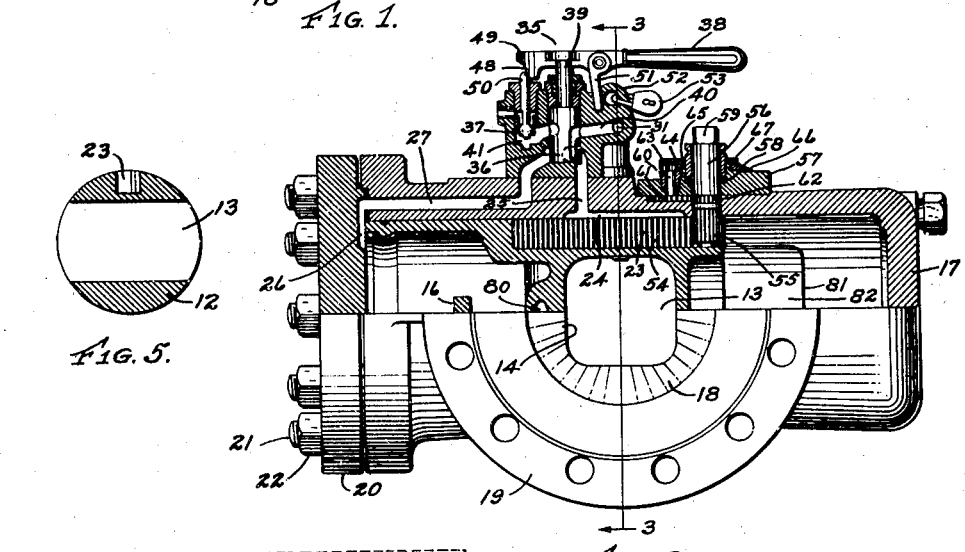
Fig. 5.
Fig. 2.
Fig. 6.
Inventor
HOMER J. SHAFER
By
Attorney Nov. 2, 1943.     H. J. SHAFER     2,333,205
PISTON VALVE
Original Filed Sept. 13, 1940     2 Sheets-Sheet 2
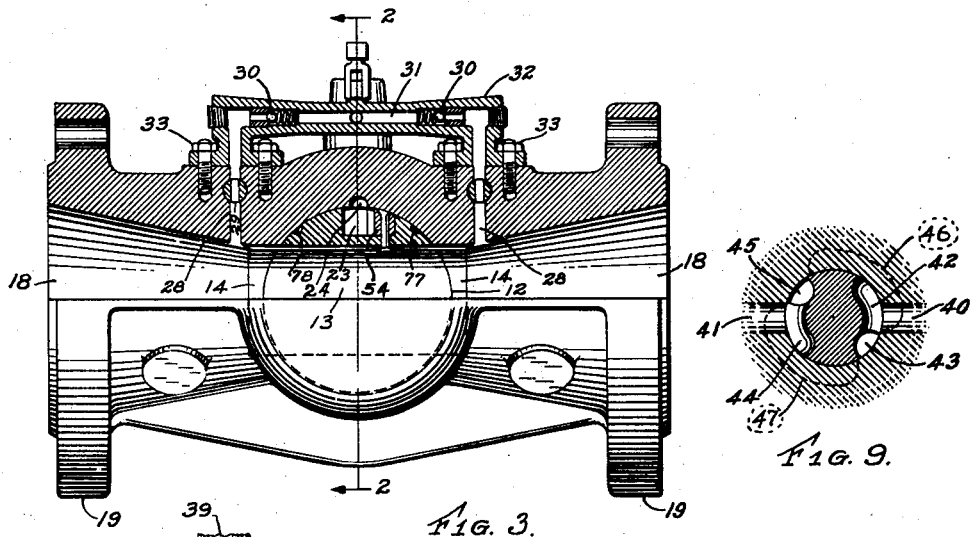
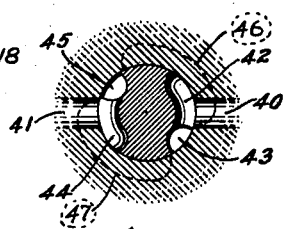
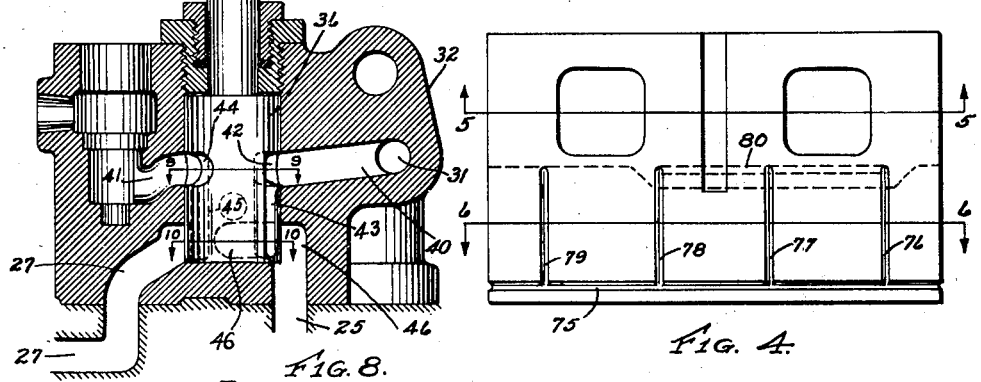
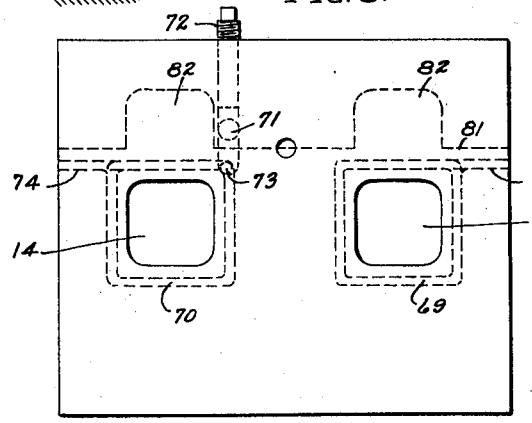
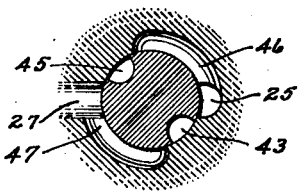
Inventor
HOMER J. SHAFER
By
Attorney Patented Nov. 2, 1943

2,333,205

UNITED STATES PATENT OFFICE 2,333,205

PISTON VALVE

Homer J. Shafer, Mansfield, Ohio, assignor to The Ohio Brass Company, Mansfield, Ohio, a corporation of New Jersey Original application September 13, 1940, Serial No. 356,642. Divided and this application August 19, 1941, Serial No. 407,420

20 Claims. (Cl. 137—139)

This invention relates to piston valves for controlling the flow of fluid in pipe lines and has for one of its objects the provision of means operated by the pressure in the line for opening or closing the valve.

Another object of the invention is to provide operating means for the valve that may be easily controlled manually by a single attendant.

Another object of the invention is to provide a piston valve that may be operated manually in the absence of fluid pressure in the line.

Another object of the invention is to provide control valve mechanism for a piston valve, including port changing valve mechanism and a poppet valve to prevent leakage through said port changing valve mechanism.

Another object of the invention is to provide an indicator for a piston valve to indicate the position of the piston valve.

Other objects and advantages will appear from the following description.

The invention is exemplified by the combination and arrangement of parts shown in the accompanying drawings and described in the following specification, and it is more particularly pointed out in the appended claims.

In the drawings:

Fig. 1 is a top plan view, with part in section, showing one embodiment of the present invention.

Fig. 2 is an elevation, partly in section on line 2—2 of Fig. 3.

Fig. 3 is an elevation partly in section on line 3—3 of Fig. 2.

Fig. 4 is a development of the surface of the valve piston.

Fig. 5 is a section of the piston on line 5—5 of Fig. 4.

Fig. 6 is a section of the piston on line 6—6 of Fig. 4.

Fig. 7 is a development of the inside surface of the valve cylinder.

Fig. 8 is a fragmentary section of the control valve on a larger scale than Fig. 2.

Fig. 9 is a fragmentary section on line 9—9 of Fig. 8.

Fig. 10 is a fragmentary section on line 10—10 of Fig. 8.

This application is a division of my copending application, Serial Number 356,642, filed September 13, 1940.

In many pipe lines, particularly of the large sizes, difficulty is experienced in operation of the control valves and especially in opening a valve that has heavy pressure on one side only or that has been closed for a long period of time. Frequently many men are required to open a valve of this kind. The present invention overcomes this difficulty by providing a piston valve that is operated by the pressure in the line so that the available pressure for operating the valve is proportional to the pressure on the valve.

In the drawings the numeral 10 designates the valve body generally, having a cylindrical bore 11 in which the valve piston 12 is mounted to reciprocate. The left hand end of the piston 12 as seen in Figs. 1 and 2 is hollow and open at the end while the right hand end is provided with a passage 13 transversely thereof and substantially rectangular in shape for registration, when the valve is open, with similarly shaped ports 14 opening through the opposite side walls of the valve body 10. The side wall of the hollow end of the piston is provided with internally thickened portions 15 which move into registration with the ports 14 when the valve is closed. The thickened portions 15 prevent any distortion of the portions of the piston wall overlying the ports when the valve is closed thus insuring accurate fit of the valve on the portion of its seat surrounding the port. The thickened portions 15 are also reenforced by a transverse strut 16 to help withstand pressure on the valve. Moreover, as will appear later, the interior of the piston is subject to line pressure when the valve is closed, tending to counteract external pressure on the portion of the valve closing the ports.

The cylindrical bore 11 is closed at one end by the end wall 17 which is integral with the other parts of the valve body, and tapered openings 18 extend at each side of the valve body from the ports 14. The walls of the openings 18 are integral parts of the valve body and are provided at their outer ends with flanges 19 for connection with the pipe line. The end of the valve cylinder opposite the wall 17 is closed by a disc 20 held in place by screws 21 and nuts 22.

The piston 12 reciprocates freely in the bore 11 and is provided with a groove 23 in its top face which serves as a passage for pressure fluid for operating the piston, as a guide for preventing rotation of the piston, and as a seat for a rack for manual operation of the piston. The groove 23 opens at its right hand end, as viewed in Fig. 2, into the end of the cylinder but is closed at its other end. Fluid under pressure may enter the right hand end of the cylinder through this groove 23 for moving the piston to the left into the position shown in Figs. 1 and 2 to bring the passage 13 into registration with the ports 14 and thus open the valve. Pressure fluid is introduced into the groove 23 through an elongated port 24 and passage 25 in the top wall of the cylinder body. Fluid pressure to close the valve enters through the port 26 formed in the inner face of the end disc 20. The pressure reaches the port 26 through the passage 27 in the wall of the valve body.

The pressure to operate the valve piston 12 is derived from the pipe line at either side of the valve through passages 28 which communicate with the tapered passages 18 respectively at opposite sides of the valve. Each passage 28 communicates through a shut off valve 29 and a check valve 30 with a common passage 31 in a control valve housing 32 secured to the main valve body by cap screws 33 as shown best in Fig. 3. The check valves 30 make it possible to derive fluid pressure from the pipe line at either side of the main valve but prevent by-passing of the pressure fluid around the main valve.

The flow of pressure fluid from the pipe line to the opposite ends of the cylinder is controlled by a manually operable four-way control valve designated generally by the numeral 35. This control valve comprises a rotary plug valve 36 and a poppet valve 37. Valves 36 and 37 are both operated by a handle 38. The valve 36 is provided with a stem 39 connecting the rotary plug with the handle 38. The passage 40 communicates through the passage 31 with the pressure line and the passage 41 communicates with the outer atmosphere, the passage 41 being controlled by the poppet valve 37. The plug 36 is provided with two L-shaped grooves in its outer periphery, one having a circumferential arm 42 and a vertical arm 43 and the other having a circumferential arm 44 and a vertical arm 45. The passage 25 communicates with a circumferential groove 46 in the face of the valve seat and the passage 27 communicates with a circumferential groove 47 also in the face of the valve seat but opposite the groove 46. The valve, in the various figures of the drawings, is shown in its mid or closed position and it has a range of movement of about 45° at either side of its mid position. It will be apparent from Fig. 9 that the groove 42 and consequently the groove 43 is in communication with the pressure line through the passage 40 for all positions of the valve and likewise the grooves 44 and 45 are connected with the passage 41 for all positions of the valve. In the position of the valve shown in the drawings the grooves 43 and 45 will be closed at their lower ends but if the handle 38 is moved in a counter-clockwise direction as viewed from above the groove 43 will be brought into registration with groove 46 which is connected with the right hand end of cylinder 11 through passage 25 port 24 and slot 23 as previously explained. The same operation of the handle will move the groove 45 into registration with groove 47 thus connecting the left hand end of the cylinder 11 with the passage 41. Movement of the handle 38 in the opposite direction will reverse the positions of the valve ports, connecting the right hand end of cylinder 11 with the pressure line and the left hand end with the passage 41. The control valve thus acts as a four-way valve for reversing the connection of the four passages leading into it. It differs from the usual four-way valve however in that it permits all of the passages to the valve to be arranged in a single plane passing through the axis of the valve instead of a plane transverse to the axis, the axially displaced passages being connected by the longitudinally extending grooves in the face of the valve. This allows a much simpler, and more economical and compact arrangement of the connections between the control valve and main valve than is possible with the conventional form of four-way valve.

As has been already pointed out the plug valve 36 does not vent the respective ends of the cylinder 11 directly to atmosphere but only to the passage 41 which is closed by the poppet valve 37. The reason for this is that it is practically impossible to make a plug valve absolutely tight and if reliance were placed in this valve alone to close the passages from the pressure line there would be great danger of leakage of the pressure fluid. This would not only result in loss of the pressure fluid but the continuous escape of many fluids into the atmosphere is not only objectionable but sometimes, as in the case of inflammable material, extremely dangerous. Since venting of the cylinder 11 depends on opening of the poppet valve 37 the movement of the piston 12 will also depend upon opening of this valve. This is especially true because, in time, after operation of the piston, the pressure will equalize at opposite sides thereof due to seepage past the piston or through the passages connected with the plug valve 36. The opening of the poppet valve 37 is effected at either end of the movement of the handle 38 by a pair of spaced cams 48 at opposite extremities of a segmental extension 49 on the lever 38 which cams are arranged to override the upwardly extending stem 50 of the poppet valve 37. After the poppet valve has been opened the differential pressure acting on the piston to move it either to open or closed position will be proportional to the line pressure acting on the valve. Heretofore it has sometimes been very difficult to open a valve that is subject to high line pressure but in the case of the present invention, the greater the pressure is on the valve, the greater will be the available pressure for opening the valve since the valve is actuated, not by force exerted by the operator but by the pressure in the line. After the valve piston has been shifted to its desired position the lever 38 is moved back to its central position thus closing the ports of the plug valve 36 and also closing the poppet valve 37 to insure that there will be no leakage of the pressure fluid. The piston will remain in the position to which it has been moved. The lever 38 is retained in its central position by a detent 51 which engages a lug 52 on the control valve housing. If desired the lever may be locked in this position by a lock 53. It may sometimes be desirable to operate the piston valve when there is no pressure in the line at either side of the valve. In this case however the valve itself will not be subjected to pressure and may easily be operated manually. A manually operating means is therefore provided for this purpose. This means comprises a rack 54 secured in the slot 23 and meshing with a pinion 55 formed on the lower end of a shaft 56 journaled in a dial base 57 secured to the valve housing 10. The shaft 56 is provided with a packing gland 58 and has a squared end 59 for receiving a wrench to rotate the shaft and move the piston 12. A second shaft 60 is journaled in the block 57 and carries a pinion 61 meshing with teeth 62 on the shaft 56. The upper end of the shaft 60 is provided with teeth forming a pinion 63 that engages teeth on the periphery of a disc 64 journaled to rotate about a boss 65 on the dial base 57. The disc 64 carries a pointer 66 that travels over a dial on the upper face of the base 57 to indicate the position of the piston 12 in the cylinder bore 11. A cover plate 67 may be secured to the block 57 over the indicator disc 64. It will be apparent that the pointer 66 will indicate the position of the piston irrespective of whether it is moved by fluid pressure or by hand. A packing gland 68 surrounds the shaft 60.

To lubricate the surfaces of the piston valve and valve seat and to provide packing for the piston valve the contacting surfaces of the piston and cylinder are provided with a system of grease grooves, as shown best in Figs. 4 and 7, which figures are developments of these surfaces. The cylinder surface, as shown in Fig. 7, is provided with grooves 69 and 70 completely surrounding the ports 14. Grease under pressure is supplied to these grooves from a reservoir 71 in the form of a hole bored into the valve body and supplied with a feed screw 72 to force the grease through an opening 73 into the groove 70. The grooves 69 and 70 are connected by a circumferential groove 74 so that grease may be supplied to both grooves from a single source. The grooves 69 and 70 are also connected by grooves in the piston as will appear by considering Figs. 4 and 7 together. The outer surface of the piston is provided with a circumferential groove 75 near one end that will register with the bottom portions of the grooves 69 and 70, as viewed in Fig. 7, when the valve is in closed position. Longitudinally extending grooves 76, 77, 78 and 79 connect with the groove 75 in position to register with the longitudinally extending portions respectively of the grooves 69 and 70 and will telescope with these portions when the piston moves in the cylinder. The free end of the groove 78 registers with the opening 73 when the valve is closed so that grease may be supplied to the piston grooves through this opening. The end of groove 78 is connected to the end of groove 76 by a transverse passage 80 across the piston formed in a rib at the bottom of the hollow end of the piston 12 as shown in Fig. 2. The grooves 76, 77, 78 and 79 will register with the longitudinal grooves in the cylinder wall and the groove 75 will register with the circumferential portion of the grooves 69 and 70 to form a double grease groove around three sides of the ports when the valve is closed to form packing to prevent seepage of the pressure fluid and the fourth side will be closed by the other circumferential portions of the grooves 69 and 70. No part of the grooves in the piston will be exposed to the pressure fluid at any time and the only part of the grooves in the cylinder wall that will ever be exposed to the pressure fluid is the circumferential portions at the sides of the rectangle over which the passage through the cylinder travels while the valve is opening and closing. After the piston has reached its opened or closed position all the grease grooves will be entirely free from contact with the line fluid.

For ease of valve operation and to prevent danger of sticking it is desirable to have the contacting surfaces of relatively movable parts as small as possible. For this reason the portion of the cylinder bore at the right hand end in Fig. 2 beyond the line 81 is left slightly larger than the piston and is not finished as this surface is inactive as a valve seat and therefore need not fit the piston closely. The line 81 does not extend circumferentially entirely around the cylinder but is offset to provide finished surfaces 82 to register with the passage through the piston and prevent escape from this passage during movement of the valve from open to closed position and vice versa.

I claim:

1. The combination with a pipe line for fluid under pressure, of a valve housing connected in said line and having a cylindrical bore therein, a piston arranged to reciprocate in said bore to open and close said pipe line, means forming passages to supply pressure fluid from said pipe line to said cylindrical bore to actuate said piston, a manually operable four-way valve for controlling said passages leading to and from said bore, a single valve in series with said four-way valve to control the exhaust from said bore; means to simultaneously control said valves; and manually operable mechanical means for actuating said piston when the pressure in said pipe line is low.

2. The combination with a pipe line for fluid under pressure, of a valve for said pipe line including a reciprocating piston, fluid pressure means for moving said piston and supplemental actuating means for said piston comprising a rack cut in a channel formed in the wall of said piston and a pinion on a shaft rotatably mounted in a wall of said valve for moving said rack, said pressure fluid for moving said piston conducted through the channel in which said rack is formed.

3. A valve comprising a body having a cylindrical bore therein, a piston arranged to reciprocate in said bore and having a longitudinal channel in the face thereof opening at one end of said piston into said bore, said body having a port therein registering with said channel for supplying fluid under pressure through said channel to said bore to actuate said piston, one face of said channel having rack teeth thereon, and a shaft journaled in said body and extending into said channel and having a pinion thereon meshing with said rack teeth for actuating said piston and for guiding said piston with said channel in registration with said port.

4. The combination with a fluid pressure pipe line of a piston valve for controlling said line, said valve comprising a valve body having a cylindrical bore therein, a piston arranged to reciprocate in said bore, said piston having a longitudinally extending channel in the face thereof opening at one end of said cylinder into said bore, said valve body having a port therein registering with said channel, means for supplying pressure fluid from said pipe line through said port and channel to said bore to move said cylinder, said means comprising a conduit connected with said pipe line at opposite sides of said piston valve to supply fluid pressure from either side of said valve, said conduit having check valves therein to prevent by-passing of fluid pressure about said piston valve through said conduit, said conduit being connected to said port between said check valves, a rack on one face of said channel, a shaft journaled in said valve body and having a pinion thereon meshing with said rack for moving said piston and an indicator on said shaft for indicating the position of said piston in said cylinder.

5. The combination with a fluid pressure pipe line, of a piston valve for controlling flow in said line, and means for directing pressure fluid from said line to said piston valve to actuate said piston valve, said means comprising a control valve for venting said piston, a poppet valve in series with said control valve to intercept any leakage of pressure fluid through said control valve, and means to actuate said poppet valve and said plug valve in a timed sequence.

6. The combination with a fluid pressure pipe line of a piston valve for controlling flow of fluid in said line and means for directing pressure fluid from said pipe line to said piston valve said means comprising a four way control valve for selectively connecting either end of said piston valve with said pipe line and the other end thereof with a vent passage, a poppet valve in said vent passage to intercept any leakage of pressure fluid from said pipe line through said control valve and means for opening said poppet valve to permit exhaust from said vent passage and for closing said poppet valve after operation of said piston valve incident to exhausting said vent passage.

7. The combination with a fluid pressure line conduit, of a valve having a fluid pressure actuated piston valve for closing said conduit, a control valve for controlling the flow of fluid pressure supplied from said conduit to actuate said fluid pressure actuated piston valve, said control valve comprising a body provided with a recess and a passage leading to said recess from said conduit and other passages leading from said body to conduct fluid pressure to said piston valve to actuate the same, a rotary plug valve positioned in said recess for controlling the fluid pressure to and from said control valve, an exhaust outlet from said recess, a supplemental valve in said recess within said body for closing said outlet and operating means associated with said rotary plug valve to move it to its operative positions, the said operative means also provided with means to move said supplemental valve to its open position when the rotary valve is in either of its operative positions.

8. A valve to control the flow of a fluid under pressure in a pipe line, comprising in combination a piston type valve to open and close the passage through the pipe line, means for directing fluid pressure from said line to said piston valve to actuate said piston valve to either of its operative positions, said means comprising a control valve for venting said piston valve, an auxiliary valve in series with the said control valve to intercept any leakage of pressure fluid through said control valve and a common means to operate the control valve and the auxiliary valve.

9. A valve comprising a valve body having a bore therein, a piston valve mounted to reciprocate in said bore, pressure fluid means to reciprocate said piston in said bore, said piston provided with a longitudinal slot in the face of the piston valve, a shaft journaled in the body and extending into said slot and extending outside the body, an indicator disposed outside the body and operatively associated with said shaft for indicating the position of said piston in said bore and means associated with the longitudinal slot and cooperating with means on the inner end of the shaft to effect a rotation of said shaft as the piston reciprocates within the bore.

10. In a valve organization; a valve body having a main passageway therein; a cylinder in said body whose bore is transversely arranged to said passageway; a piston valve reciprocably mounted in said bore to open and close said passageway; a single reversing control valve mounted on said body; conduits connecting said passageway with said control valve; conduits connecting said control valve with said cylindrical bore; a single secondary valve associated with said control valve for controlling the exhaust to the atmosphere; and means to operate said control valve and said secondary valve in a predetermined sequence.

11. In a control valve organization; a valve body having a passageway therein; a cylinder in said body having a bore transversely arranged to the axis of said passageway; a piston valve reciprocably mounted in said cylinder; a plug valve rotatably mounted in a housing secured to said body; conduits connecting said passageway and said valve; conduits connecting said valve with said cylinder; said housing having a duct leading to the atmosphere and operatively associated with said plug valve; a valve in said duct; a lever to actuate said plug valve; and means on said lever to actuate said valve in said duct.

12. In a valve organization; a valve body having a passageway therein adapted to transmit pressure fluid and a cylinder whose bore is transverse to the axis of said passageway; a piston valve reciprocably mounted in said cylinder; means to control the reciprocation of said piston by pressure fluid passing through said passageway; means to manually reciprocate said piston; a portion of said manual means adapted to conduct pressure fluid to one end of said cylinder; and means operatively associated with said manual means to indicate the position of said piston in said cylinder, said means indicating the position of said piston in said bore whether same is reciprocated manually or by pressure fluid.

13. In a valve organization; a valve body having a presure fluid conducting passageway and a cylinder bore whose axis is transverse to the axis of said passageway; a piston valve in said cylinder bore; pressure fluid means to actuate said piston valve including a conduit connecting said cylinder bore with said passageway; a control valve interposed in said conduit to control the admission of pressure fluid to said bore; means to control the rate of piston movement when actuated by pressure fluid; means to manually reciprocate said piston valve in said bore; and indicator means gear connected with said manual means to indicate the position of said piston valve in said bore, said indicator operative when said piston valve is reciprocated by pressure fluid means.

14. In a valve combination; a valve body having a pressure fluid conducting passageway and a cylindrical bore whose axis is disposed transversely to the axis of said passageway; a piston valve in said bore; means to selectively apply pressure fluid to either end of said bore derived from said passageway to reciprocate said piston valve in said bore; means to manually move said piston valve in said bore which includes a channel in said piston valve, one face of which has a rack formed thereon; a shaft mounted in the wall of said body mounting a gear engaging said rack; an indicator associated with said rack; and a transmission connecting said indicator and said shaft, said indicator informing the operator of the position of said piston valve in said bore whether it is reciprocated manually or by pressure fluid.

15. In a device as defined in claim 14, in which said pressure fluid means includes conduits formed in the wall of said valve body and in which one of said included conduits connects with said channel to transmit pressure fluid to one end of said bore.

16. In a pressure fluid valve; a valve body having a pressure fluid passageway therethrough; a piston-cylinder device on said valve body whose axis is transversely disposed to the axis of said passageway; pressure fluid means to reciprocate said piston; manual means to reciprocate said piston which includes a rack cut in the walls of a channel formed in said piston and a pinion engaging said rack supported for rotation in said valve body, said piston being reciprocated upon rotation of said pinion; and said channel conducting pressure fluid for said pressure fluid means when it is reciprocating said piston.

17. In a valve organization; a valve body having a reciprocable element therein; means to control said reciprocable element which includes a reversing valve; a valve in the exhaust line leading from said reversing valve; a handle means to rotate said reversing valve; and a cam element on said handle engageable with said exhaust valve to control its opening and closing in a timed relation with said reversing valve.

18. In a control element for a piston valve; a valve body having a reciprocable element therein; means to control said reciprocable element which includes a housing for retaining a control valve; a rotatable valve element mounted in said housing; a conduit in said housing connecting said rotatable valve with the atmosphere; a valve in said conduit; means to rotate said rotatable valve; and means associated with said means to control said valve in said conduit in a timed relation with said rotatable valve.

19. In a control system; a piston valve organization; means to control the opening and closing of said piston valve which includes a housing on said piston valve organization; a first valve element in said housing; said housing having a conduit therein connecting said first valve to the atmosphere; a second valve in said housing adapted to open and close said conduit; means to actuate said first valve; and cam means on said means engageable with said second valve adapted to actuate said second valve in timed relation with said first valve.

20. A valve comprising a body having a cylindrical bore and a transversely disposed passageway therein conducting pressure fluid, a piston arranged to reciprocate in said bore to open and close said passageway, means to reciprocate said piston, said piston having a channel extending longitudinally thereof in the face of said piston, teeth on the wall of said channel forming a rack, a shaft journaled in said body and extending into said channel and a pinion on said shaft meshing with said teeth to reciprocate said piston in said bore and to hold said piston from rotation on its own axis, said channel conducting pressure fluid to reciprocate said piston.

HOMER J. SHAFER.